United States Patent
Patil et al.

(10) Patent No.: US 12,075,258 B2
(45) Date of Patent: Aug. 27, 2024

(54) METHOD AND SYSTEM FOR INTER-RADIO ACCESS TECHNOLOGY PACKET DATA NETWORK CONNECTION MANAGEMENT

(71) Applicant: Verizon Patent and Licensing Inc., Basking Ridge, NJ (US)

(72) Inventors: Sudhakar Reddy Patil, Flower Mound, TX (US); Deepa Jagannatha, Bridgewater, NJ (US); Violeta Cakulev, Millburn, NJ (US); Raquel Morera Sempere, Weehawken, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 111 days.

(21) Appl. No.: 17/538,702

(22) Filed: Nov. 30, 2021

(65) Prior Publication Data

US 2023/0171604 A1   Jun. 1, 2023

(51) Int. Cl.
*H04W 16/10* (2009.01)
*H04W 48/08* (2009.01)
*H04W 88/16* (2009.01)

(52) U.S. Cl.
CPC .......... *H04W 16/10* (2013.01); *H04W 48/08* (2013.01); *H04W 88/16* (2013.01)

(58) Field of Classification Search
CPC ..... H04W 48/08; H04W 48/16; H04W 48/18; H04W 84/042; H04W 76/10; H04W 76/11; H04W 76/12; H04W 76/15; H04W 76/16; H04W 16/02; H04W 16/04; H04W 16/10; H04W 16/12; H04W 88/16; H04W 80/10; H04W 36/14; H04W 36/142; H04W 36/144
See application file for complete search history.

(56) References Cited

U.S. PATENT DOCUMENTS

| | | | |
|---|---|---|---|
| 2019/0159117 A1* | 5/2019 | Kuge | H04W 48/17 |
| 2021/0105328 A1* | 4/2021 | Zong | H04L 67/146 |
| 2022/0104115 A1* | 3/2022 | Jeong | H04W 48/18 |

* cited by examiner

*Primary Examiner* — Peter Chen

(57) ABSTRACT

A method, a device, and a non-transitory storage medium are described in which an inter-RAT PDN connection management service is provided. The service may include provisioning a packet data network (PDN) session based on network slice (NS) and access point name (APN) information received from an end device via a non-slice radio access device. The service may further include provisioning, during the PDU session, a network slice based on the NS and APN information in which core devices of the network slice are selected and the same as the core devices that supported the PSN session.

20 Claims, 13 Drawing Sheets

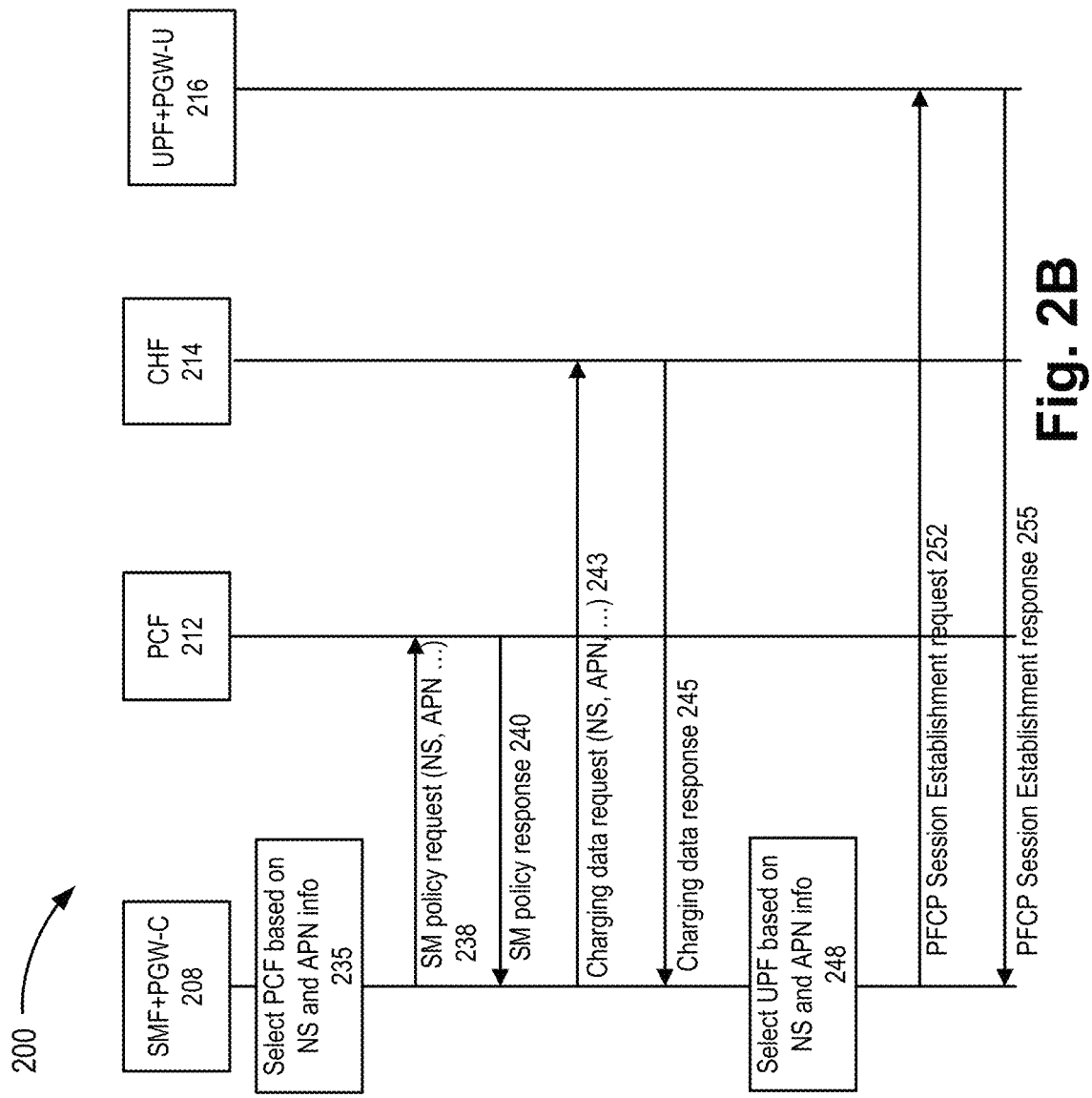

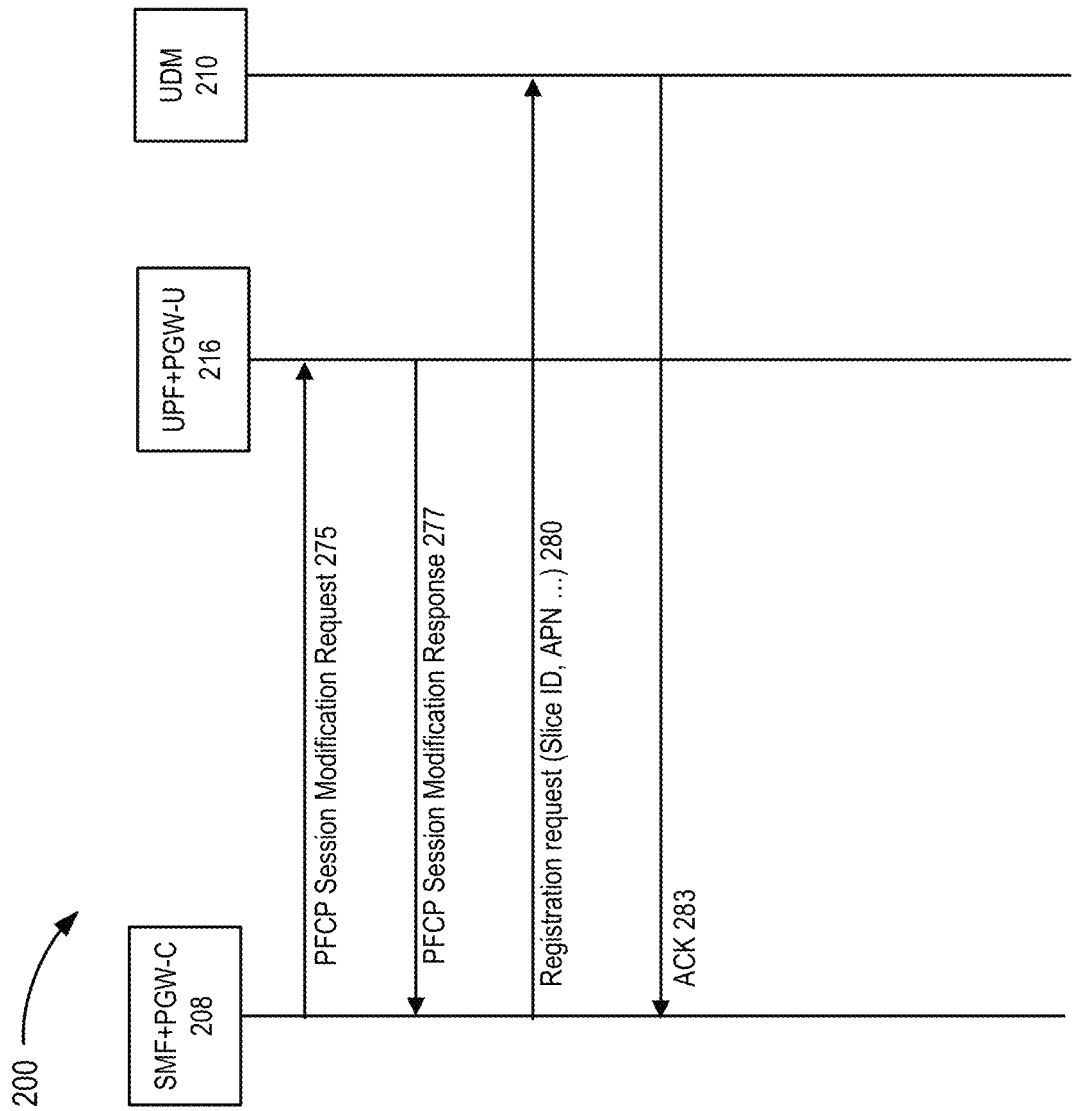

METHOD AND SYSTEM FOR INTER-RADIO ACCESS TECHNOLOGY PACKET DATA NETWORK CONNECTION MANAGEMENT

BACKGROUND

Development and design of networks present certain challenges from a network-side perspective and an end device perspective. For example, Next Generation (NG) wireless networks, such as Fifth Generation New Radio (5G NR) networks are being deployed and under development, and there are inter-operability challenges with legacy networks.

BRIEF DESCRIPTION OF THE DRAWINGS

FIGS. 2A-2E are diagrams illustrating an exemplary process of an exemplary embodiment of the inter-RAT PDN connection management service;

DETAILED DESCRIPTION

Figure 1:
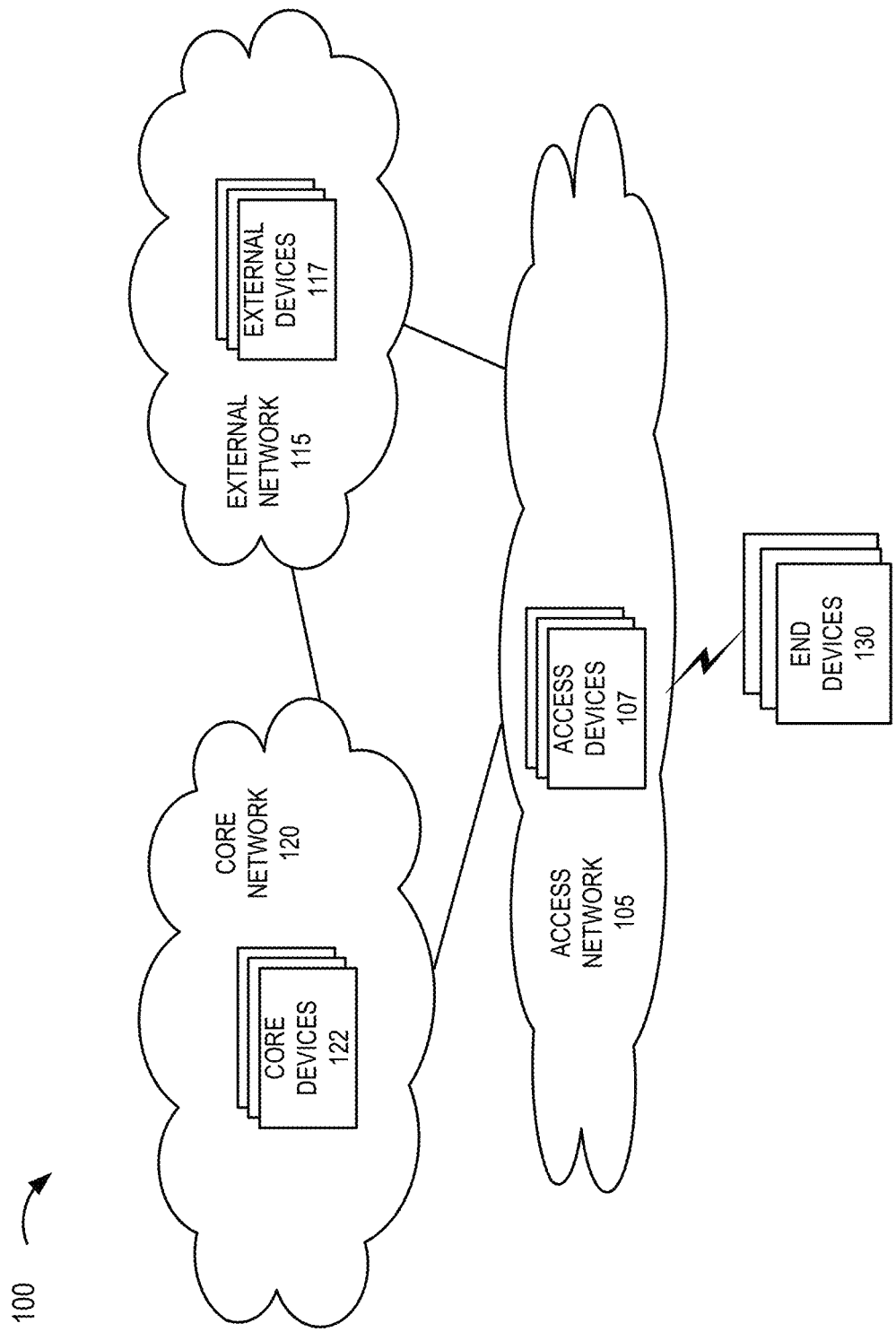
FIG. 1 is a diagram illustrating an exemplary environment in which an exemplary embodiment of an inter-radio access technology (RAT) packet data network (PDN) connection management service may be implemented.

The following detailed description refers to the accompanying drawings. The same reference numbers in different drawings may identify the same or similar elements. Also, the following detailed description does not limit the invention.

When an end device, such as a user equipment (UE), establishes a packet data network (PDN) connection via a Fourth Generation (4G) or 4.5G network, and subsequently moves to a Fifth Generation (5G) network, for example, there currently is no mechanism available to provide corresponding network slice information to a network device of the 5G core network. As an example, when the UE may have established multiple PDN connections via a 4G RAN and the same access point name (APN) and during the PDN sessions moves and uses a 5G RAN, the 5G core network may be unable to appropriately map the PDN connections to corresponding different network slices. As a result, an application service session may be negatively impacted because the network slice may not suitably support the session. As a further complication, a 4G core network will ignore or reject any network slice information that is received from the UE.

According to exemplary embodiments, an inter-RAT PDN connection management service is provided. According to an exemplary embodiment, the inter-RAT PDN connection management service may be implemented in a non-standalone (NSA) Option 3X configuration or scenario. According to other exemplary embodiments, the inter-RAT PDN connection management service may be implemented according to other NSA configurations or scenarios.

According to an exemplary embodiment, the inter-RAT PDN connection management service may provide network slice information, which may include a network slice identifier, and an access point name (APN) or another type of data instance (e.g., that may indicate a PDN, an application service, a name of a gateway device, a network path, or the like) (referred to herein as simply an "APN") to a core network via a non-slice radio access network (RAN), such as a 4G and/or a 4.5G RAN. For example, an end device may include such information in a request, such as a PDN connectivity request.

According to various exemplary embodiments, the request may include an information element (IE), such as Protocol Configuration Options (PCO) data or an extended PCO (ePCO) data, which includes the network slice and APN information. The request may be received by a network device of the core network. For example, the network device may be implemented as a multi-RAT network device, such as a session management function+packet gateway control plane (SMF+PGW-C) device. The network device may store a mapping or correlation between the APN and the network slice information. According to an exemplary embodiment, the inter-RAT PDN connection management service may establish a PDN connection via the non-slice RAN and the core network based on the network slice information and the APN.

According to an exemplary embodiment, during the life of PDN sessions, the end device may enter and/or switch over to a slice-enabled RAN, such as a 5G RAN. According to an exemplary embodiment, the inter-RAT PDN connection management service may use the PDN context information, which may include the correlation or mapping information, to establish a network slice via the same network device. For example, the network slices may be supported by the same SMF+PGW-C device and user plane function+PGW-user plane (UPF+PGW-U) device. According to an exemplary embodiment, the inter-RAT PDN connection management service may update associations pertaining to 5G RAN/RAT access and RAN device(s) in relation to other network devices of the core network, as described herein.

In view of the foregoing, the inter-RAT PDN connection management service may enable distinct PDN connections, which may include the same or different APNs, for example, to different network slices when an end device moves from a non-slice RAN to a slice-enabled RAN. In this way, application service session continuity and performance metrics may be ensured.

FIG. 1 is a diagram illustrating an exemplary environment 100 in which an exemplary embodiment of inter-RAT PDN connection management service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices, and the number of end devices 130 are exemplary. For purposes of description, end device 130 is not considered a network device.

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a 5G interface, another generation of interface (e.g., 5.5G, 6G, 7G, etc.), or some other type of interface.

Access network 105 may include one or multiple networks of one or multiple types and technologies. For example, access network 105 may be implemented to include a 5G RAN, a future generation RAN (e.g., a sixth generation (6G) RAN, a seventh generation (7G) RAN, or a subsequent generation RAN), a centralized-RAN (C-RAN), and/or another type of access network. Access network 105 may include a legacy RAN (e.g., a third generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120.

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access.

External network 115 may include one or multiple networks of one or multiple types and technologies that provides an application service. For example, external network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a MEC network, a fog network, the Internet, a PDN, a service provider network, the World Wide Web (WWW), an Internet Protocol Multimedia Subsystem (IMS) network, a Rich Communication Service (RCS) network, an SD network, a virtual network, a packet-switched network, a data center, or other type of network that may provide access to and may host an end device application service.

Depending on the implementation, external network 115 may include various network devices such as external devices 117. For example, external devices 117 may include virtual network devices (e.g., virtualized network functions (VNFs), servers, host devices, containers, hypervisors, virtual machines (VMs), network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and mobility management function (AMF), an SMF, a unified data management (UDM) device, a unified data repository (UDR), an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a PGW, a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

End devices 130 include a device that may have computational and/or communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130. End devices 130 may include "edge-aware" and/or "edge-unaware" application service clients.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, cm wave, etc.), various levels and genres of network slicing, DC service, CA service, and/or other types of connectivity services. Additionally, end device 130 may include one or multiple communication interfaces that provide one or multiple (e.g., simultaneous, interleaved, etc.) connections via the same or different RATs, frequency bands, carrier frequencies, network slices, and/or via another communication medium (e.g., wired, etc.). The multimode capabilities of end device 130 may vary among end devices 130.

FIGS. 2A-2E are diagrams illustrating an exemplary process 200 of an exemplary embodiment of the inter-RAT PDN connection management service. Process 200 may be performed in an exemplary environment that includes an access device 107, such as an eNB 202, of an access network 105, various types of core devices 122, such as an MME 204, an SGW-C 206, an SMF+PGW-C 208, a UDM 210, a PCF 212, a CHF 214, and a UPF+PGW-U 216, of core network 120, and external devices 117, such as application server 218-1 and application server 218-2, of external network 115. According to other exemplary embodiments, the exemplary environment may include a different type of access device 107 and/or core device(s) 122. Additionally, the type of messages illustrated and described are exemplary. According to other exemplary embodiments, additional and/or different messages may be transmitted and/or received to implement process 200 and the inter-RAT PDN connection management service, as described herein. Some messages may have been omitted for the sake of brevity. According to an exemplary embodiment, inter-RAT PDN connection management service logic may perform a step of process 200.

Figure 2A:
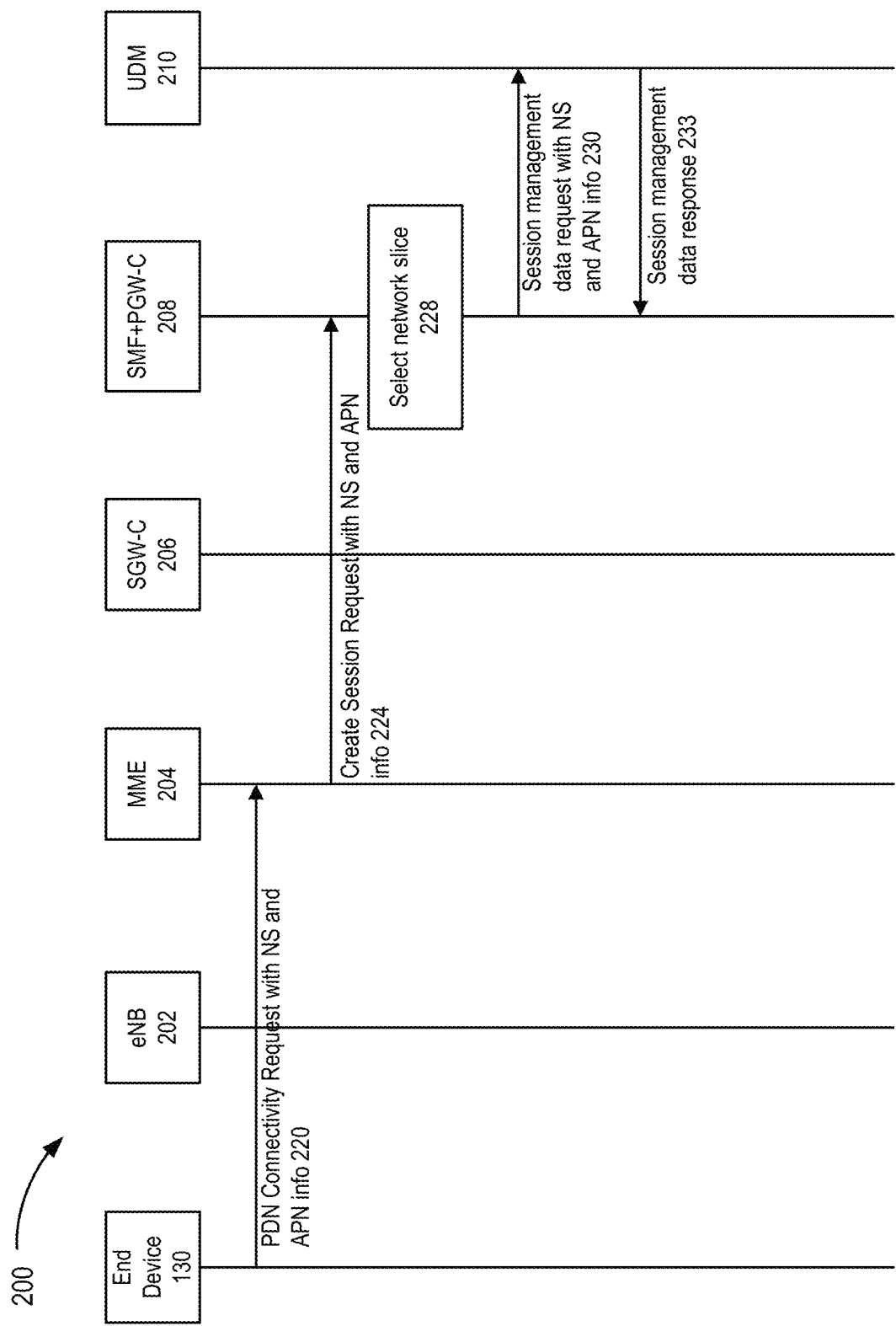

Referring to FIG. 2A, according to an exemplary scenario, assume end device 130 initiates a PDN connection via a 4G or 4.5 RAN. As illustrated, end device 130 may generate and transmit a PDN connectivity request 220 that includes network slice (NS) and APN information. According to an exemplary embodiment, end device 130 may include logic of the inter-RAT PDN connection management service that may evaluate rules configured on end device 130 that include a correlation or mapping between APNs and network slices. For example, according to an exemplary implementation, end device 130 may analyze UE Route Selection Policy (URSP) rules in an Evolved Packet System Connection Management (ECM)-Idle or Connected mode of operation when an application requests network connectivity. According to another exemplary implementation, the rules or configuration may be implemented as device management system (DMS) information. According to yet another exemplary implementation, end device 130 may store network slice information associated with a previous network slice session pertaining to the application of relevance.

Figure 4:
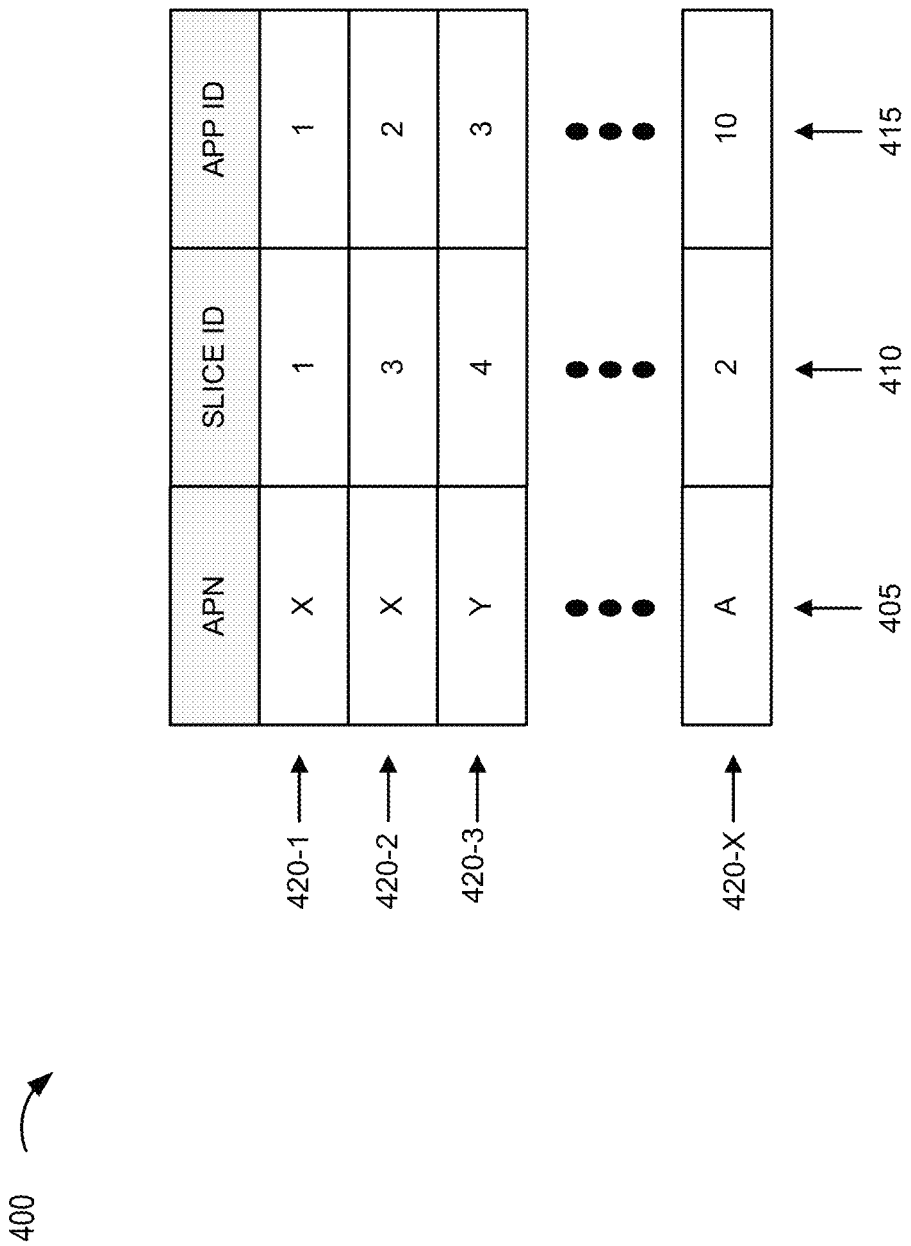
FIG. 4 is a diagram illustrating another exemplary process of an exemplary embodiment of the inter-RAT PDN connection management service.

FIG. 4 is a diagram illustrating exemplary inter-RAT PDN connection management information that may be stored, for example, by end device 130. As illustrated, a table 400 may include an APN identifier field 405, a network slice identifier field 410, and an application identifier field 415. As further illustrated, table 400 includes records 420-1 through 420-X (also referred to as records 420, or individually or generally as record 420) that each includes a grouping of fields 405 through 415 (e.g., correlated information). Inter-RAT PDN connection management information is illustrated in tabular form merely for the sake of description. In this regard, inter-RAT PDN connection management information may be implemented in a data structure different from a table. The values illustrated in fields 405, 410, and 415 are exemplary.

APN identifier field 405 may store data indicating an APN or another type of data instance that may indicate a PDN, an application service, a name of a gateway or core network anchor device (e.g., UPF, PGW, or the like), for example.

Slice identifier field 410 may store data indicating a network slice identifier, an S-NSSAI or an SST value, for example, as described herein. Application identifier field 415 may store data that identifies an application or an application service, as described herein.

According to other exemplary implementations, table 400 may store additional, fewer, and/or different instances of inter-RAT PDN connection management information in support of the inter-RAT PDN connection management service, as described herein.

End device 130 may select the appropriate rule or configuration instance for the PDN connection request 220 based on the analysis or lookup (e.g., table 400) in view of the requested application service. As a part of the generation of PDN connectivity request 220, end device 130 may include an IE that includes the NS and APN information pertaining to the requesting application. According to various exemplary implementations, the IE may be included as PCO data or ePCO data, as previously mentioned. The NS information may include an identifier of a network slice, single network slice selection assistance information (S-NSSAI), or a portion of S-NSSAI (e.g., a slice service type (SST) value). The APN information may include an APN or another type of data instance, as described herein. End device 130 may transmit PDN connectivity request 220 to MME 204 via eNB 202 using non-access stratum (NAS).

In response to receiving PDN connectivity request 220, MME 204 may read and/or evaluate PDN connectivity request 220. Based on the included NS and APN information, MME 204 may generate a Create Session Request 224 that includes the NS and APN information. MME 204 may select SMF+PGW-C 208 and transmit Create Session Request 224 to SMF+PGW-C via SGW-C 206. In response to receiving Create Session Request 224, SMF+PGW-C 208 may read and/or analyze Create Session Request 224. Based on the NS and APN info, SMF+PGW-C 208 may select a network slice 228 for the APN.

Additionally, SMF+PGW-C 208 may query UDM 210 for session management (SM) data pertaining to the PDN request. For example, SMF+PGW-C 208 may generate an SM data request 230 that includes the NS and APN information and transmit request 230 to UDM 210. UDM 210 may provide an SM data response 233 that includes SM subscription data to SMF+PGW-C 208. Referring to FIG. 2B, SMF+PGW-C 208 may select a PCF based on the NS and APN info 235 in which SM policy request 238, which includes the NS and APN information, may be transmitted to PCF 212. PCF 212 may transmit an SM policy response 240 that may include SM policy data and/or decision. Also, SMF+PGW-C 208 may transmit a charging data request 243, which includes the NS and APN information, to CHF 214. CHF 214 may transmit a charging data response 245, which may include charging data.

Figure 2C:
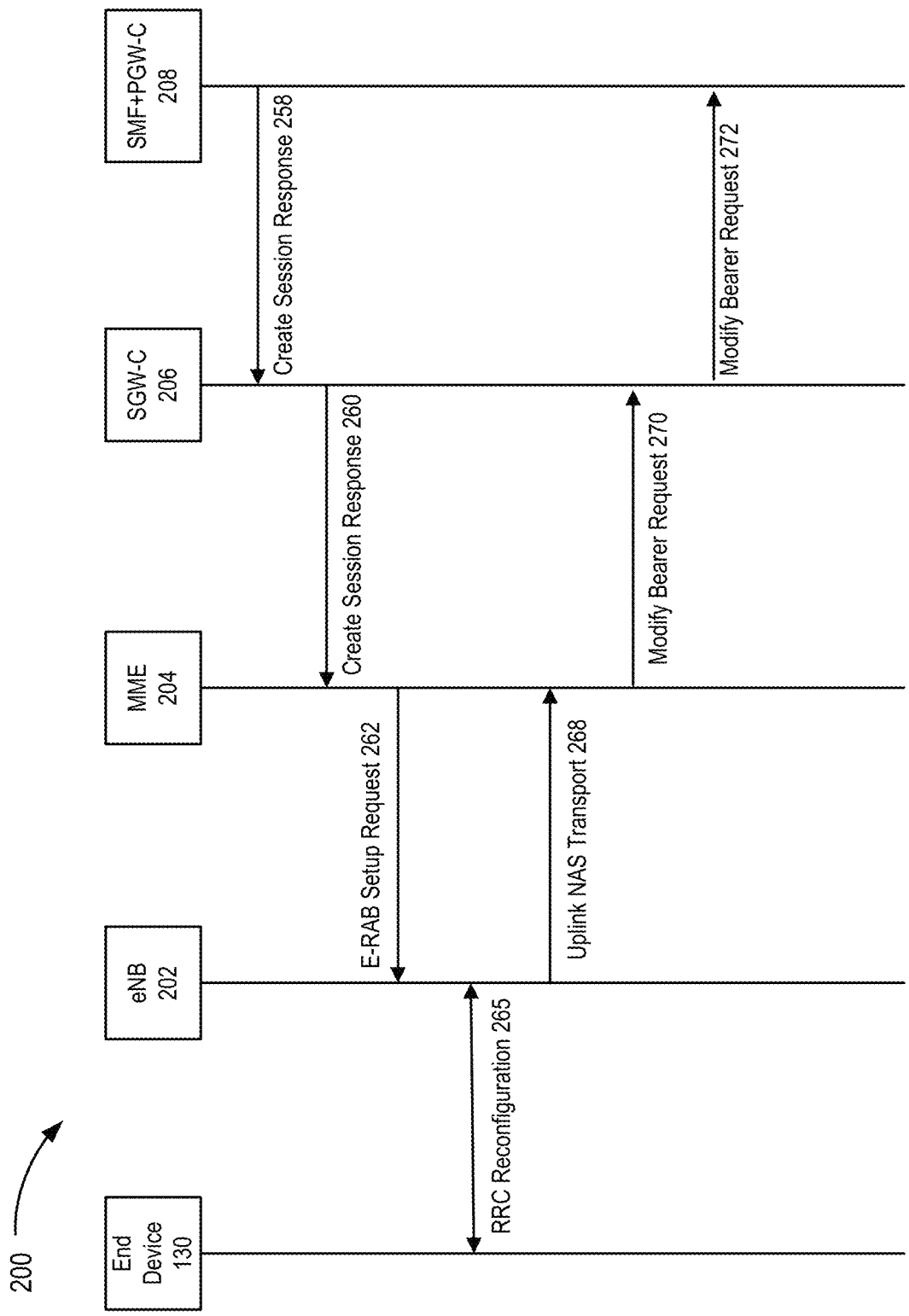

As further illustrated, SMF+PGW-C 208 may select a UPF (e.g., UPF+PGW-U 216) based on the NS and APN info 248. After the selection, SMF-PGW-C 208 and UPF+ PGW-U 216 may exchange packet forwarding control plane (PFCP) session establishment establish request 252 and response 255 messages. Referring to FIG. 2C, the PDN connection establishment may further include additional exchanges of messages, such as a Create Session response 258 between SMF+PGW-C 208 and SGW-C 206 that may include the network address of UPF+PGW-U 216, a Create Session Response 260 that may include the network address of an SGW-U (not illustrated) between SGW-C 206 and MME 204, an E-UTRAN Radio Access Bearer (E-RAB) setup request 262, RRC reconfiguration messages 265, an Uplink NAS transport message 268, and Modify Bearer requests 270, and 272.

Referring to FIG. 2D, SMF+PGW-C 208 may transmit a PFCP session modification request 275 to UPF+PGW-U 216, and may receive a PFCP session modification response 277 from UPF+PGW-U 216. SMF+PGW-C 208 may transmit a registration request 280, which includes the NS and APN info, to UDM 210, and UDM 210 may respond with an Acknowledgement 283, for example.

Figure 2E:
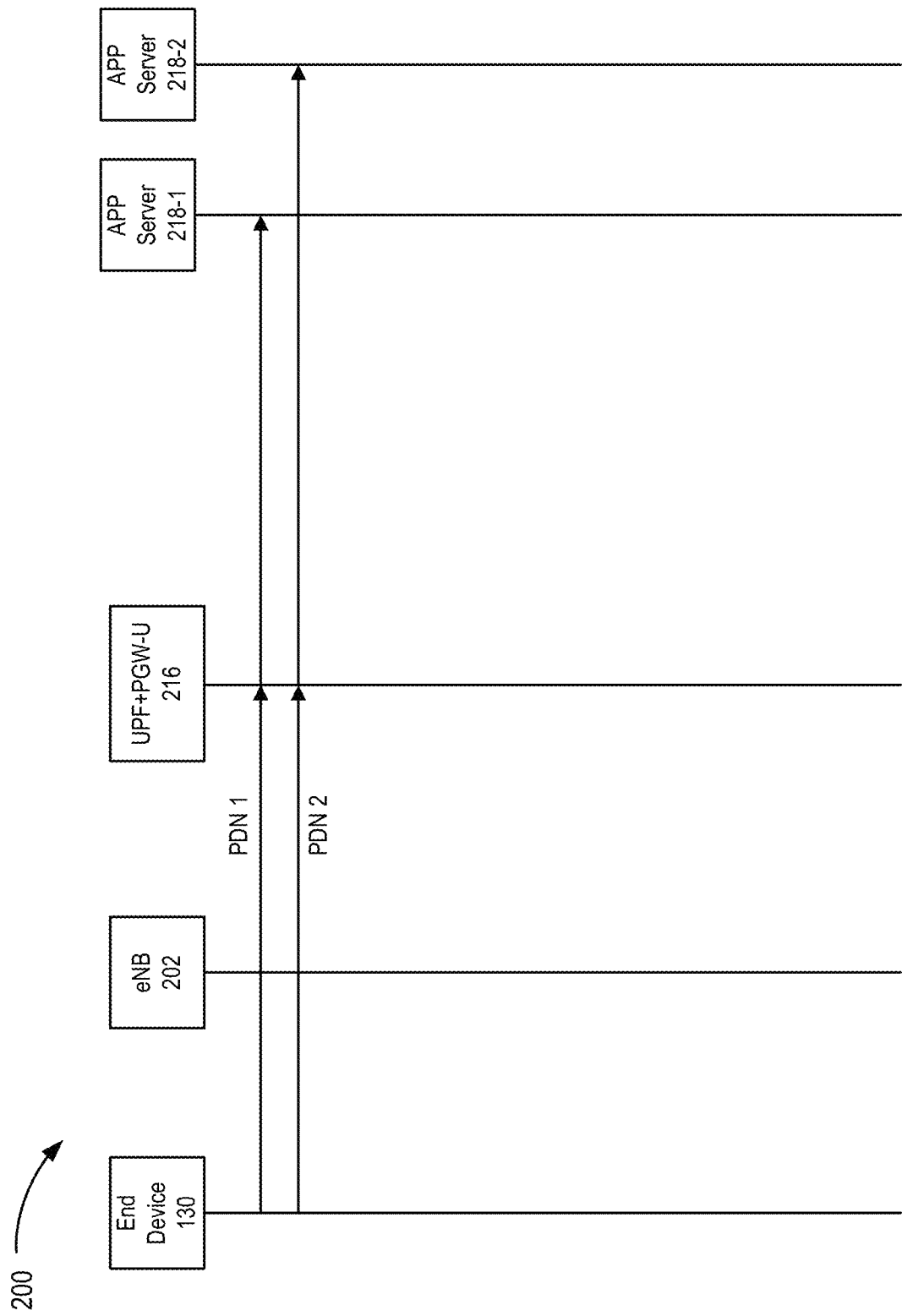

Referring to FIG. 2E, end device 130 may establish a PDN connection 1 and a PDN connection 2 to application server 218-1 and application server 218-2, respectively, via UPF+PGW-U 216 based on multiple iterations of process 200. As previously explained, end device 130 may establish multiple PDN connections via a non-slice RAN, such as a 4G RAN and a 4.5G RAN, and the same APN, such as UPF+PGW-U 216. Referring to FIG. 4, as an example, PDN connection 1 may be mapped to record 415-1 and APN X (e.g., UPF+PGW-U 216) and PDN connection 2 may be mapped to record 415-2 and APN X (e.g., UPF+PGW-U 216). As also illustrated, APN X may be mapped to different network slices, such as network slice 1 and network slice 3. According to an exemplary embodiment, the inter-RAT PDN connection management service may associate an ongoing PDN session to a network slice when end device 130 may subsequently use (e.g., due to mobility) a slice-enabled RAN. For example, the inter-RAT PDN connection management service may associate and configure PDN connection 1 to network slice 1 and PDN connection 2 to network slice 3. An exemplary process of this procedure is described further below.

Figure 3A:
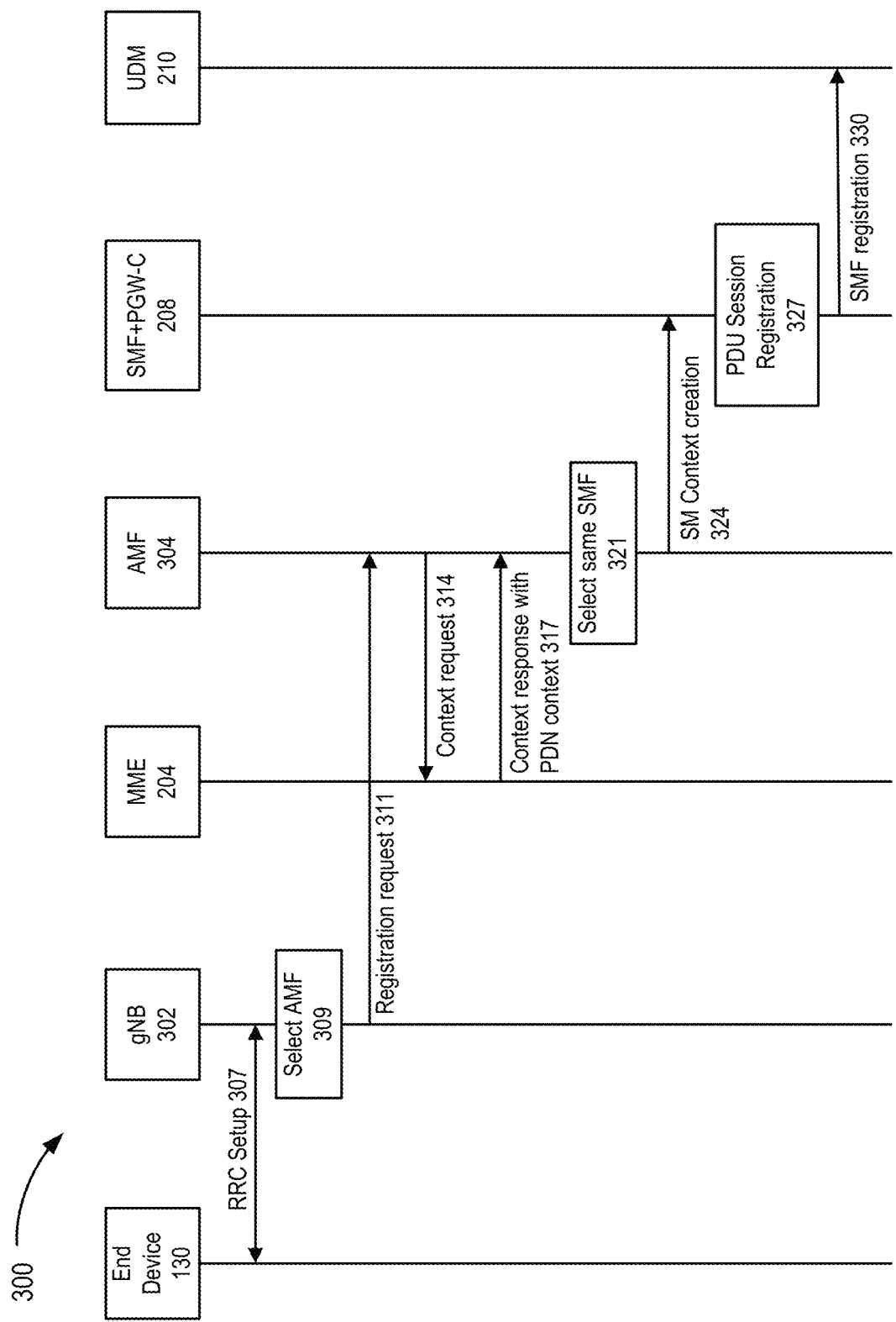
FIGS. 3A-3C are diagrams illustrating another exemplary process of an exemplary embodiment of the inter-RAT PDN connection management service.
Figure 3B:
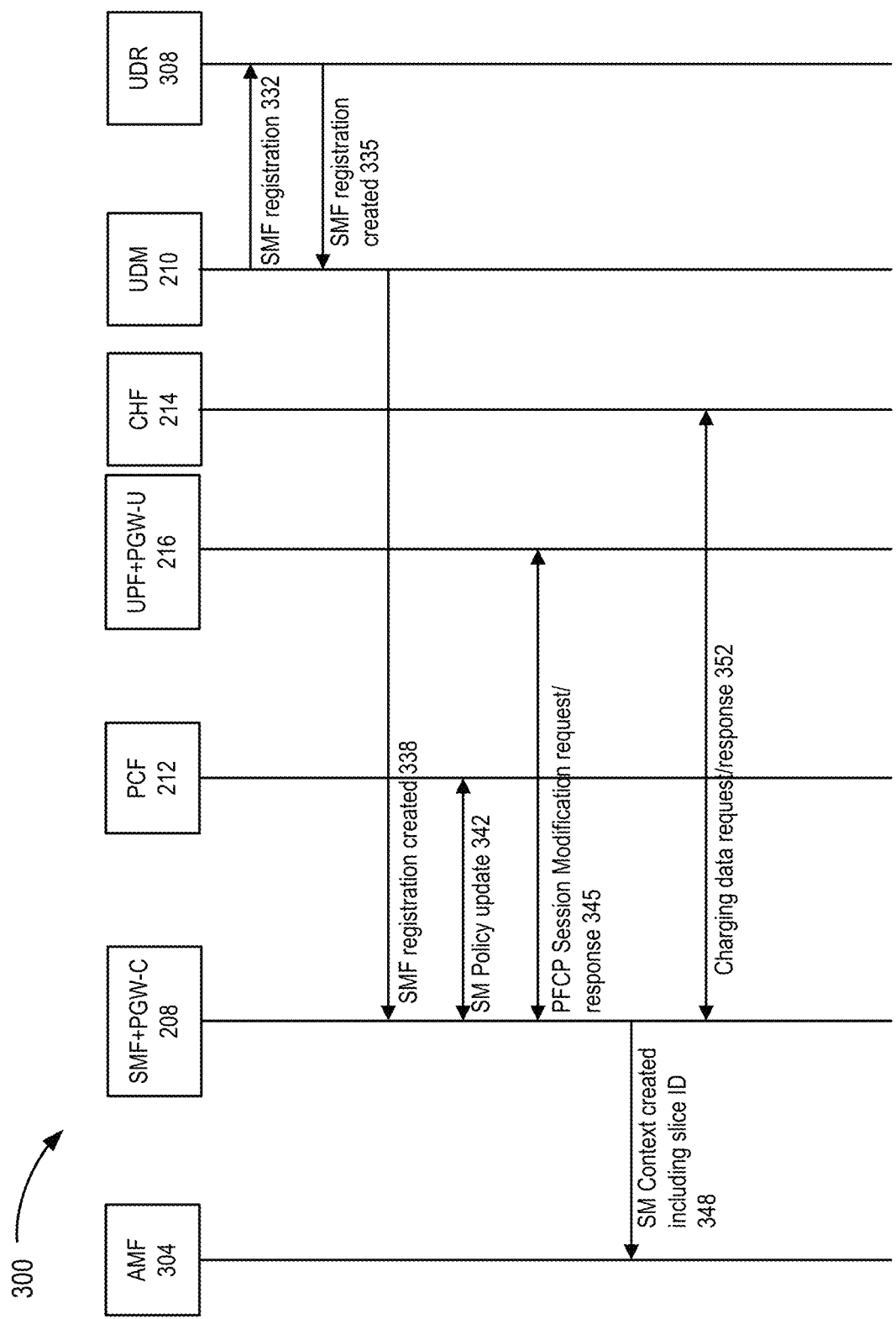
Figure 3C:
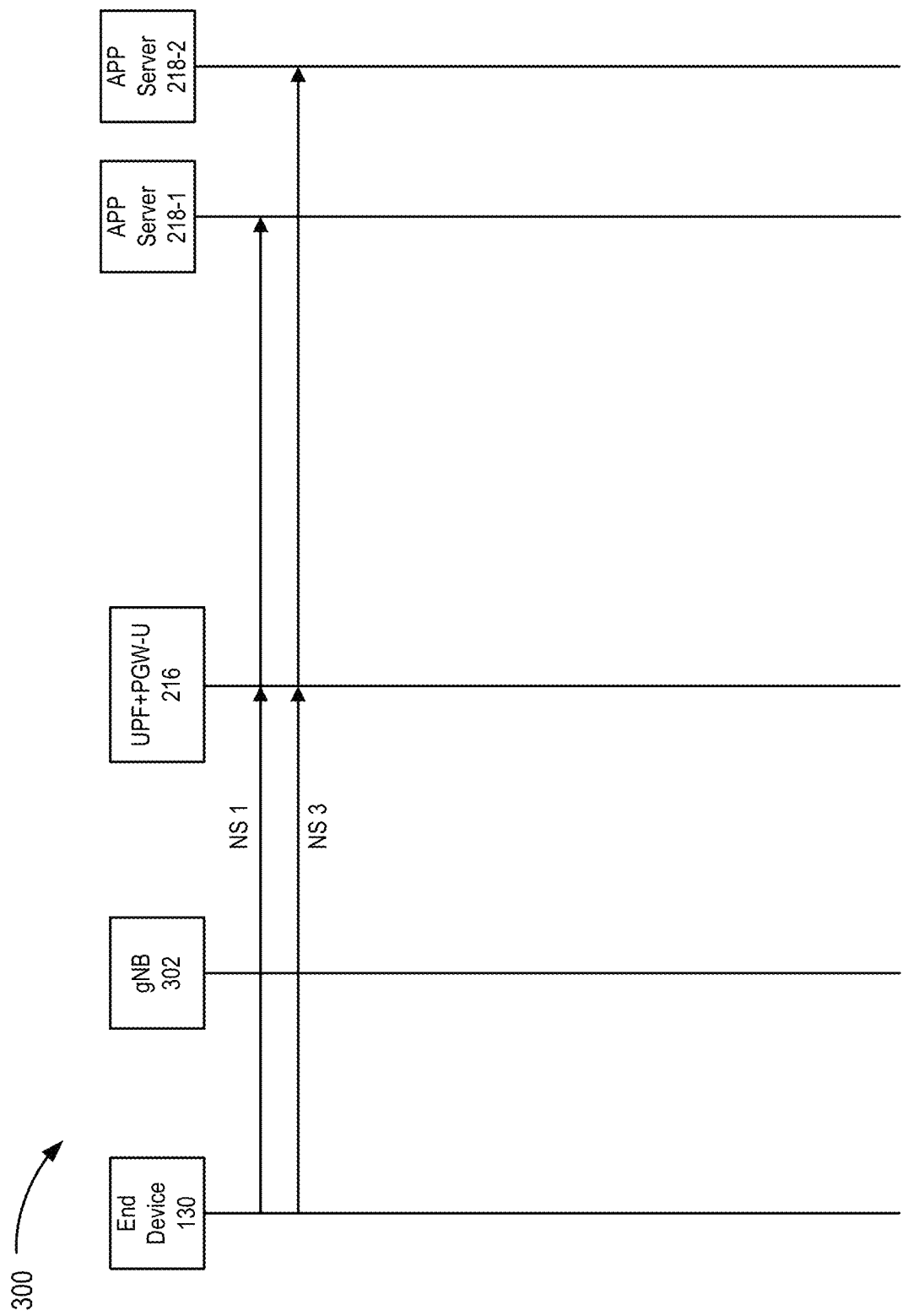

FIGS. 3A-3C are diagrams illustrating an exemplary process 300 of an exemplary embodiment of the inter-RAT PDN connection management service. Process 200 may be performed in an exemplary environment that includes an access device 107, such as a gNB 302, of an access network 105, various types of core devices 122, such as an AMF 304, of core network 120, in addition to at least some of the network device previously described in relation to process 200. According to other exemplary embodiments, the exemplary environment may include a different type of access device 107 and/or core device(s) 122. Additionally, the type of messages illustrated and described are exemplary. According to other exemplary embodiments, additional and/or different messages may be transmitted and/or received to implement process 300 and the inter-RAT PDN connection management service, as described herein. Some messages may have been omitted for the sake of brevity. According to an exemplary embodiment, inter-RAT PDN connection management service logic may perform a step of process 300.

As illustrated in FIG. 3A, assume that end device 130 moves into NG-RAN coverage from EPC coverage, and initiates a Radio Resource Control (RRC) setup procedure 307 with gNB 302 (e.g., a slice-enabled or slice-capable radio access device). After completion, gNB 302 may select 309 an AMF. gNB 302 may transmit a Registration request 311, which may have been received from end device 130 during RRC setup procedure 307, to the selected AMF, such as AMF 304. In response, AMF 304 may transmit a Context request 314 to MME 204. MME 204 may store context information pertaining to the PDN sessions. MME 204 may generate and transmit a Context response 317 that includes the PDN context. For example, the PDN context may include data indicating SMF 208 as supporting both PDN sessions.

As further illustrated, AMF 304 may select 321 SMF, such as SMF 208 and may transmit a session management (SM) context create request 324 to SMF+PGW-C 208. In response, SMF+PGW-C 208 may invoke a PDU session registration 327. For example, SMF+PGW-C 208 may transmit SMF registration information 330, which may include data that associates existing network devices (e.g., UDM, CHF, PCF, etc.) pertaining to the PDN sessions with the NR RAT type (e.g., gNB 302, etc.), to UDM 210. Referring to FIG. 3B, in response, UDM 210 and UDR 308 may perform an update procedure, illustrated as an SMF registration request 332 and an SMF registration creation response 335, which is subsequently propagated to SMF+PGW-C 208 as an SMF registration creation response 338. As further illustrated, SMF+PGW-C 208 may perform an SM policy update procedure 342 with PCF 212 that includes updating the RAT type change. Also, SMF+PGW-C 208 may perform a PFCP session modification procedure with UPF+PGW-U 216 in which a PFCP session modification request and a PFCP session modification response may be exchanged 345. UPF+PGW-U 216 may update context information of the PDN sessions with a network address of gNB 302. SMF+PGW-C 208 may transmit network slice information to AMF, such as in an SM context created 348. SMF+PGW-C 208 may store context information, which may include at least the correlation/mapping between APN and network slice (e.g., in table 400), and select the network slices based on this information to provide to AMF 304. SMF+PGW-C 208 and CHF 214 may also exchange charging data request and response 352 regarding the update.

Although not illustrated, additional messaging may occur regarding the PDN sessions in relation to MME 204 and perhaps other 4G/4.5G core device(s) (e.g., SGW, etc.) in view of the network slices established. Additionally, AMF 304 and end device 130 may complete the registration accept procedure via gNB 302.

Referring to FIG. 3C, end device 130 may establish or maintain application sessions with application server 218-1 and application server 218-2 via gNB 302, UPF+PGW-U 216, and network slice 1 and network slice 3. Additionally, other core devices 122 of the initial PDN sessions may support these application sessions, as described herein, such as SMF+PGW-C 208, PCF 212, CHF 214, UDM 210, and so forth. In some exemplary scenarios in which a different core device 122 may be needed to support the network slice, process 300 may provision such core device 122. For example, network slice 1 and network slice 3 may be supported by different PCFs 212.

Figure 5:
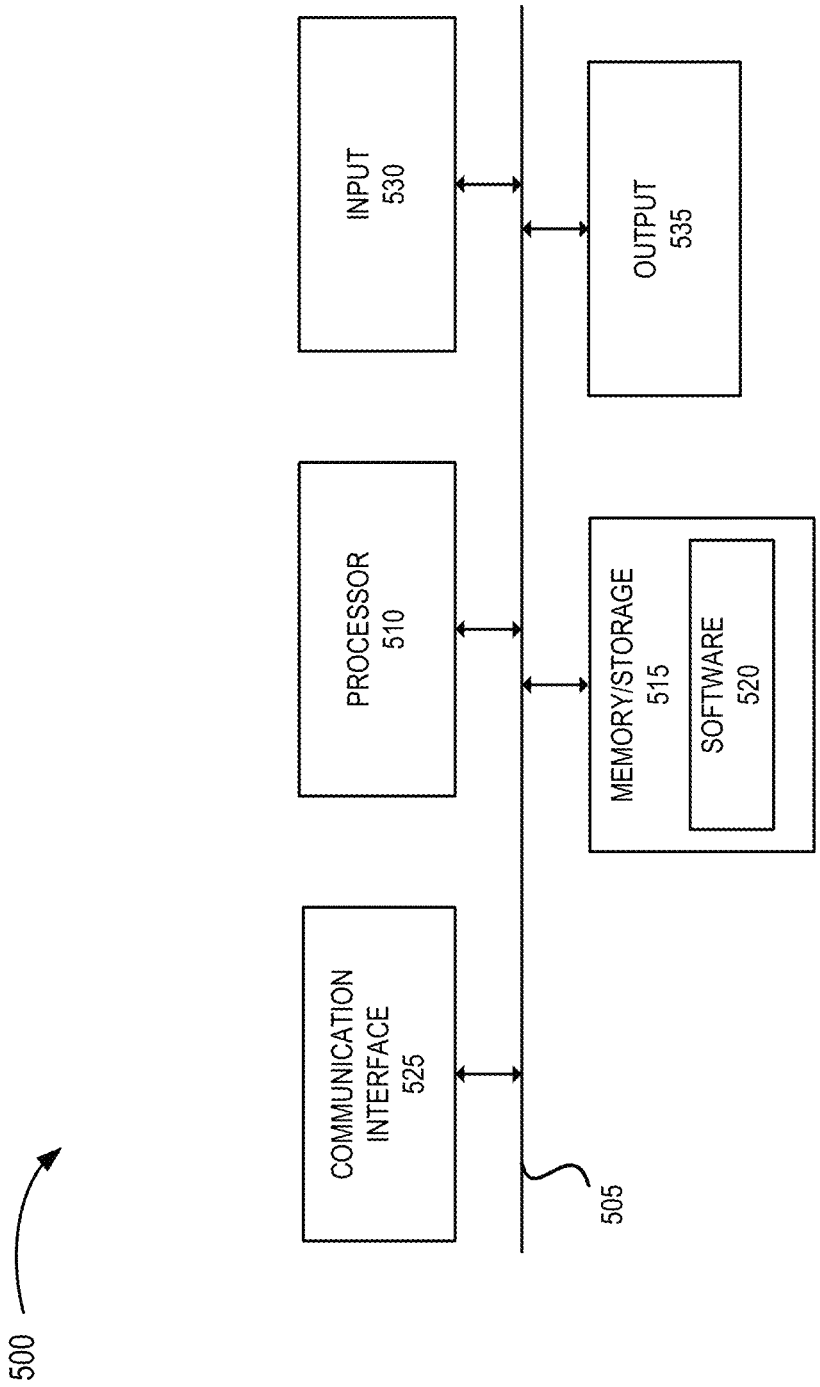
FIG. 5 is a diagram illustrating exemplary components of a device that may correspond to one or more of the devices illustrated and described herein.

FIG. 5 is a diagram illustrating exemplary components of a device 500 that may be included in one or more of the devices described herein. For example, device 500 may correspond to access device 107, external device 117, core device 122, end device 130, and/or other types of devices, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation, or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, learning, model-based, etc.

Memory/storage 515 includes one or multiple memories and/or one or multiple other types of storage mediums. For example, memory/storage 515 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to SMF+PGW-C 208, software 520 may include an application that, when executed by processor 510, provides a function and/or a process of inter-RAT PDN connection management service, as described herein. Additionally, with reference to end device 130, software 520 may include an application that, when executed by processor 510, provides a function and/or a process of inter-RAT PDN connection management service, as described herein. Also, with reference to other network devices, such as other core devices 122 and access device 107, software 520 may include an application that, when executed by processor 510, provides a function and/or a process of inter-RAT PDN connection management service, as described herein. Software 520 may also include firmware, middleware, microcode, hardware description language (HDL), and/or other form of instruction. Software 520 may also be virtualized. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard.

Input 530 permits an input into device 500. For example, input 530 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 500 may be implemented in the same manner. For example, device 500 may be instantiated, created, deleted, or some other operational state during its life-cycle (e.g., refreshed, paused, suspended, rebooting, or another type of state or status), using well-known virtualization technologies. For example, access device 107, core device 122, external device 117, and/or another type of network device or end device 130, as described herein, may be a virtualized device.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a function or a process described herein. Alternatively, for example, according to other implementations, device 500 performs a function or a process described herein based on the execution of hardware (processor 510, etc.).

Figure 6:
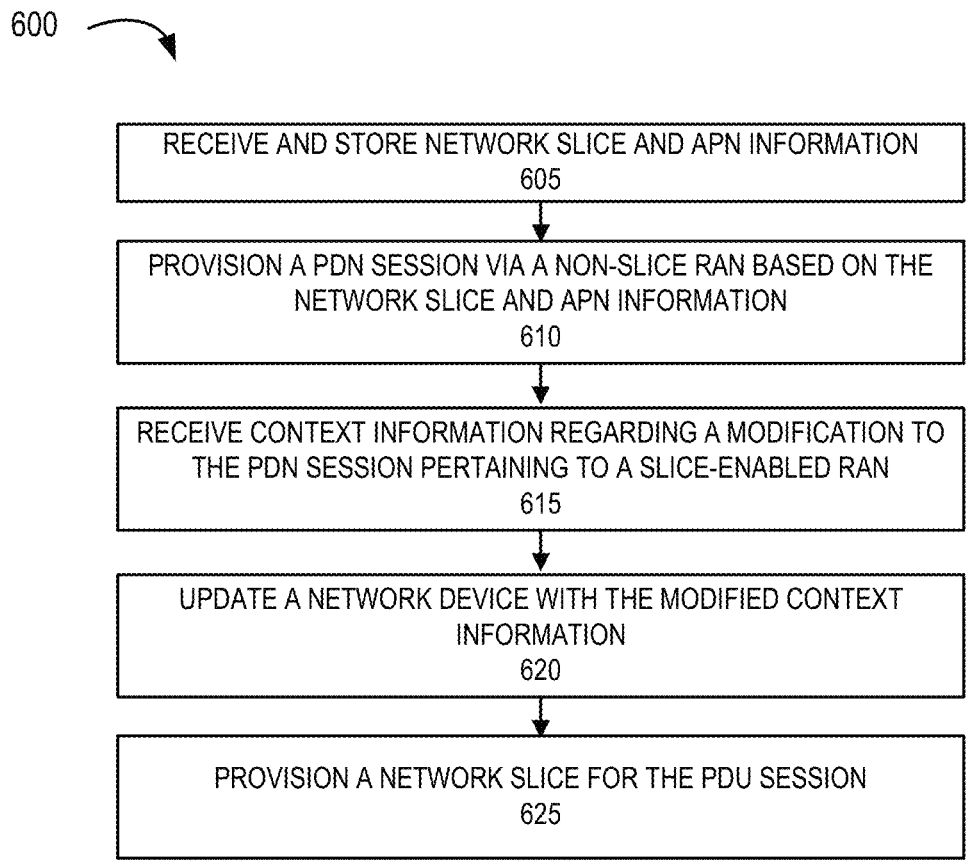
FIG. 6 is a flow diagram illustrating yet another exemplary process of an exemplary embodiment of an inter-RAT PDN connection management service.

FIG. 6 is a flow diagram illustrating an exemplary process 600 of an exemplary embodiment of inter-RAT PDN connection management service. According to an exemplary embodiment, core device 122 may perform a step of process 600. For example, a step may be performed by an SMF+PGW-C device. According to other exemplary embodiments, a step may be performed by a different core device 122. According to an exemplary implementation, processor 510 executes software 520 to perform the step of process 600, as described herein. Alternatively, the step may be performed by execution of only hardware.

In block 605, network slice information and APN information may be received and stored. For example, the SMF+PGW-C device may receive network slice and APN information from end device 130 in a request, such as a PDN connectivity request. End device 130 may be attached to a non-slice access device 107, such as an eNB. According to an exemplary scenario, at least control plane messaging may be transmitted to and from the eNB. According to some exemplary scenarios, end device 130 may be also attached to a gNB, for example, on a user plane.

In block 610, a PDN session via a non-slice RAN may be provisioned based on the network slice and APN information. For example, the SMF+PGW-C device may provide the network slice and APN information to various other core devices 122 and may select a user plane anchor device (e.g., UPF-PGW-U) for supporting the PDN session to be established, as described herein.

In block 615, context information regarding a modification to the PDN session may be received. For example, the SMF+PGW-C device may receive context information regarding end device 130 and connection to a slice-enabled system (e.g., 5GS). By way of further example, as described herein, end device 130 may attach to a gNB and initiate establishment of the PDU session via a 5G core network.

In block 620, a network device may be updated with the context information. For example, SMF+PGW-C device may select other core devices 122 (e.g., UDM, PCF, CHF, UPF etc.) that may be supporting the PDN session based on context information stored during the establishment and maintenance of the PDN session, as described herein. By way of further example, SMF+PGW-C device may update PDU session registration information, policy control information, and PFCP session information associated with the PDU session with the updated context information, as described herein.

In block 625, a network slice for the PDU session may be provisioned. For example, SMF+PGW-C device may provision a network slice for the PDU session. By way of further example, SMF+PGW-C device may provide the network slice information to an AMF. Upon completion of the provisioning, a network slice may support the on-going application service session via the gNB, for example.

FIG. 6 illustrates an exemplary embodiment of a process of the inter-RAT PDN connection management service, according to other exemplary embodiments, the inter-RAT PDN connection management service may perform additional operations, fewer operations, and/or different operations than those illustrated and described.

Figure 7:
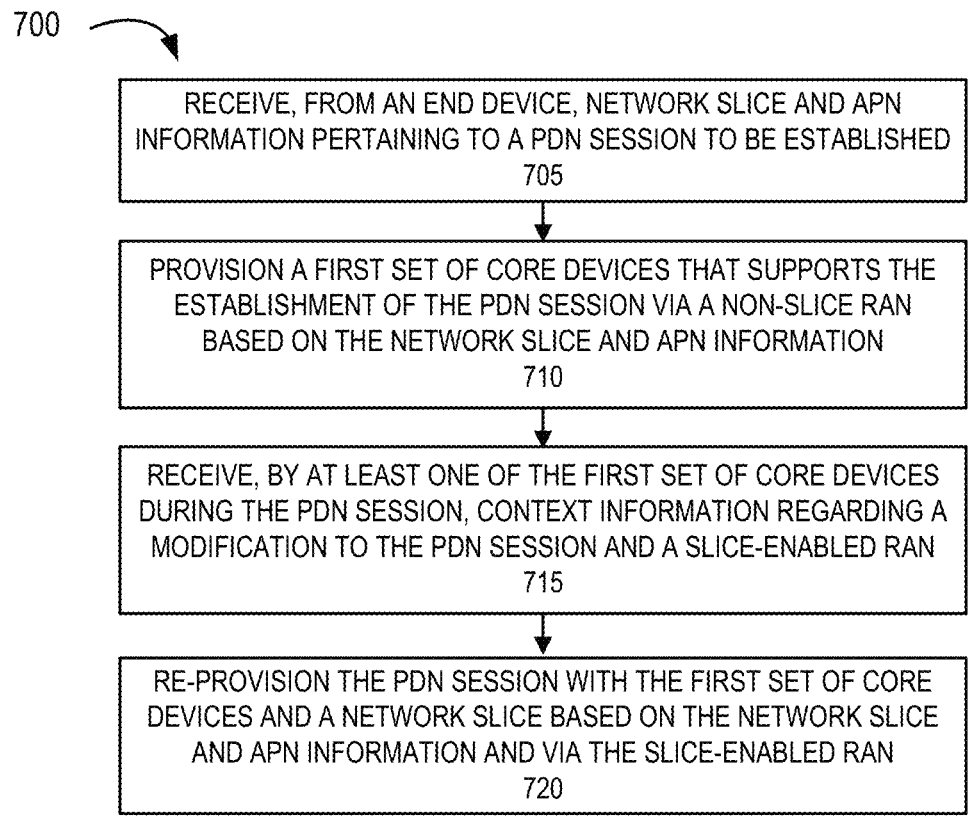
FIG. 7 is a flow diagram illustrating still another exemplary process of an exemplary embodiment of an inter-RAT PDN connection management service.

FIG. 7 is a flow diagram illustrating an exemplary process 700 of an exemplary embodiment of inter-RAT PDN connection management service. According to an exemplary embodiment, core network 120 may perform process 700. According to an exemplary implementation, processor 510 executes software 520 to perform the step of process 700, as described herein. Alternatively, the step may be performed by execution of only hardware.

In block 705, core network 120 may receive from end device 120, network slice and APN information pertaining to a PDN session to be established. In block 710, core network 120 may provision a first set of core devices 122 that supports the establishment of the PDN session via a non-slice RAN based on the network slice and APN information.

In block 715, core network 1120 may receive, by at least one of the first set of core devices 122 during the PDU session, context information regarding a modification to the PDN session and a slice-enabled RAN. In block 720, core network 120 may re-provision the PDN session with the first set of core network devices and a network slice based on the network slice and APN information and via the slice-enabled RAN.

FIG. 7 illustrates an exemplary embodiment of a process of the inter-RAT PDN connection management service, according to other exemplary embodiments, the inter-RAT PDN connection management service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 6 and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
receiving, by an inter-networking network device of a core network from an end device via a non-sliced radio access device, a packet data network (PDN) connection request that includes network slice (NS) and access point name (APN) information, wherein the NS and APN information includes a network slice identifier, an application identifier, and an APN;
provisioning, by the inter-networking network device based on the NS and APN information, a PDN session via the non-slice radio access device of a PDN connection to an application server;
receiving, by the inter-networking network device during the PDN session, a modification to the PDN session pertaining to a slice-enabled radio access device to which the end device is attached; and
provisioning, by the inter-networking network device based on the NS and APN information, a network slice, which includes the slice-enabled radio access device, and supports a packet data unit (PDU) session to the application server, wherein the NS and APN information identifies the network slice.

2. The method of claim 1, wherein a first set of core devices associated with the provisioning of the PDN session via the non-slice radio access device are the same as core devices of the network slice.

3. The method of claim 1, wherein the provisioning of the PDN session via the non-slice radio access device comprises:
selecting, by the inter-networking network device, a user plane function and a policy control function (PCF) based on the NS and APN information.

4. The method of claim 3, wherein the network slice is provisioned with the user plane function.

5. The method of claim 1, wherein the provisioning of the network slice includes providing at least a portion of the NS and APN information to an access and mobility management function (AMF).

6. The method of claim 1, wherein the provisioning of the network slice includes updating core devices of the core network with context information pertaining to the PDU session with a network address of the slice-enabled radio access device.

7. The method of claim 1, wherein the PDN session includes multiple PDN sessions, and the PDN sessions via the non-slice radio access device are associated with a same APN indicated by the NS and APN information.

8. The method of claim 1, wherein the inter-networking network device includes a session management function and a packet gateway control plane (SMF+PGW-C) device.

9. A network device comprising:
a processor configured to:
receive from an end device via a non-slice radio access device, a packet data network (PDN) connection request that includes network slice (NS) and access point name (APN) information, wherein the network device is an inter-networking network device of a core network, and wherein the NS and APN information includes a network slice identifier, an application identifier, and an APN;
provision, based on the NS and APN information, a PDN session via the non-slice radio access device of a PDN connection to an application server;
receive, during the PDN session, a modification to the PDN session pertaining to a slice-enabled radio access device to which the end device is attached; and
provision, based on the NS and APN information, a network slice, which includes the slice-enabled radio access device, and supports a packet data unit (PDU) session to the application server, wherein the NS and APN information identifies the network slice.

10. The network device of claim 9, wherein a first set of core devices associated with the provisioning of the PDN session via the non-slice radio access device are the same as core devices of the network slice.

11. The network device of claim 9, wherein, when provisioning the PDN session via the non-slice radio access device, the processor is further configured to:
select a user plane function and a policy control function (PCF) based on the NS and APN information.

12. The network device of claim 11, wherein the network slice is provisioned with the user plane function.

13. The network device of claim 9, wherein the provisioning of the network slice includes providing at least a portion of the NS and APN information to an access and mobility management function (AMF).

14. The network device of claim 9, wherein the provisioning of the network slice includes updating core devices of the core network with context information pertaining to the PDN session with a network address of the slice-enabled radio access device.

15. The network device of claim 9, wherein the PDN session includes multiple PDN sessions, and the PDN sessions via the non-slice radio access device are associated with a same APN indicated by the NS and APN information.

16. The network device of claim 9, wherein the network device includes a session management function and a packet gateway control plane (SMF+PGW-C) device.

17. A non-transitory computer-readable storage medium storing instructions executable by a processor of an inter-networking network device of a core network, wherein the instructions are configured to cause the inter-networking network device to:
receive from an end device via a non-slice radio access device, a packet data network (PDN) connection request that includes network slice (NS) and access point name (APN) information, wherein the NS and APN information includes a network slice identifier, an application identifier, and an APN;
provision, based on the NS and APN information of the PDN connection request, a PDN session via the non-slice radio access device and the PDN connection to an application server;
receive, during the PDN session, a modification to the PDN session pertaining to a slice-enabled radio access device to which the end device is attached; and
provision, based on the NS and APN information, a network slice, which incudes the slice-enabled radio access device, and supports a packet data unit (PDU) session to the application server, wherein the NS and APN information identifies the network slice.

18. The non-transitory computer-readable storage medium of claim 17, wherein a first set of core devices associated with the provisioning of the PDN session via the non-slice radio access device are the same as core devices of the network slice.

19. The non-transitory computer-readable storage medium of claim 17, wherein the instructions to provision the PDN session via the non-slice radio access device comprise further instructions configured to:
select a user plane function and a policy control function (PCF) based on the NS and APN information.

20. The non-transitory computer-readable storage medium of claim 17, wherein the instructions to provision the network slice comprise further instruction configured to:
update core devices of the core network with context information pertaining to the PDN session with a network address of the slice-enabled radio access device.

* * * * *